Oct. 1, 1957     C. F. ABRESCH ET AL     2,808,063
DOMESTIC DISHWASHING APPLIANCE

Filed Sept. 1, 1954     6 Sheets-Sheet 1

INVENTORS
Carel F. Abresch
Francis H. McCormick
BY
Their Attorney

Oct. 1, 1957  C. F. ABRESCH ET AL  2,808,063
DOMESTIC DISHWASHING APPLIANCE
Filed Sept. 1, 1954  6 Sheets-Sheet 3

INVENTORS
Carel F. Abresch
Francis H. McCormick
BY
Their Attorney

INVENTORS
Carel F. Abresch
Francis H. McCormick
BY
Their Attorney

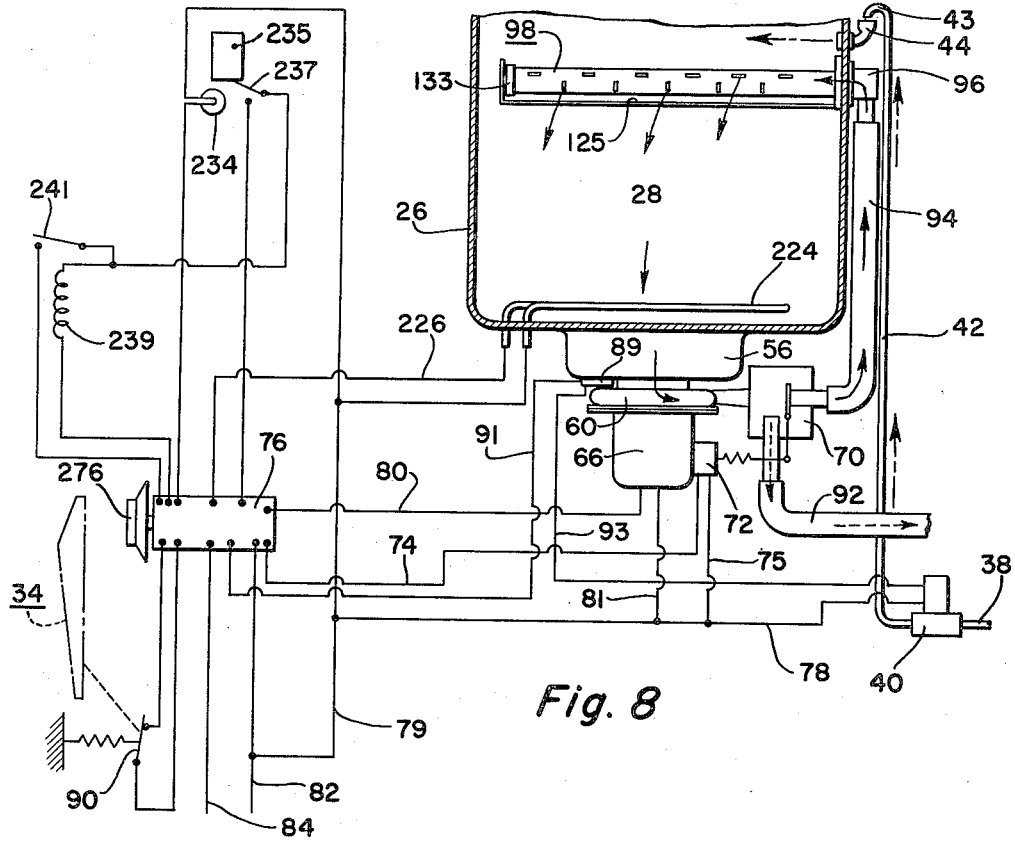

Oct. 1, 1957   C. F. ABRESCH ET AL   2,808,063
DOMESTIC DISHWASHING APPLIANCE
Filed Sept. 1, 1954   6 Sheets-Sheet 6

INVENTORS
Carel F. Abresch
Francis H. McCormick
BY
Their Attorney

United States Patent Office 2,808,063
Patented Oct. 1, 1957

2,808,063

DOMESTIC DISHWASHING APPLIANCE

Carel F. Abresch and Francis H. McCormick, Dayton, Ohio, assignors to General Motors Corporation, Detroit, Mich., a corporation of Delaware Application September 1, 1954, Serial No. 453,462

6 Claims. (Cl. 134—57)

This invention relates to a domestic appliance and more particularly to domestic dishwashing machines.

This application is a continuation-in-part of our co-pending application S. N. 262,226 filed December 18, 1951, which issued on February 14, 1956, as Patent 2,734,520.

It is an object of our invention to provide a dishwashing machine in which the incoming water supply is provided with a vacuum breaker which will pass all plumbing codes and yet has sufficient force to provide an adequate spray for washing food particles off dishes into the dishwasher drain.

It is another object of our invention to provide a dishwashing machine in which large food particles are immediately removed from the dishwashing chamber and are prevented from being re-deposited upon the dishes.

It is another object of our invention to provide a dishwashing machine having an automatically operating strainer which by the mere action of water upon it permits the waste discharge of cleansing liquid to flow without straining but which strains the recirculating cleansing liquid.

It is another object of our invention to provide a dishwashing machine in which a strainer for recirculating cleansing liquid is cleaned at the end of each wash and rinse period by the liquid to be discharged to the drain.

It is another object of our invention to provide a small compact dishwashing machine which is easily loaded and unloaded and washes thoroughly a large quantity of various types of dishes, tableware, cups, glasses, pots and pans at the same time if desired.

It is another object of our invention to provide a dishwashing machine with an improved horizontal spray tube and to provide supporting means for the articles to be washed above and below the spray tube which will accommodate a maximum number of a variety of articles and will also assure excellent washing and rinsing.

These objects are obtained by providing a dishwashing machine which is rectangularly shaped and provided with a table top construction to harmonize with other cabinets and appliances in the kitchen. It includes a front opening door and upper and lower racks rolling and moving horizontally into and out of the front door opening. A rotatable horizontal spray tube located between the racks projects streams of water radially and forwardly and rearwardly upon the articles on the upper and lower racks. The initial fill comes from a siphon breaker which discharges a stream of cleansing fluid across a gap downwardly into a rubber elbow to form a spray which discharges and distributes itself within the dishwashing chamber. The dishwashing chamber is provided with a two-way outlet valve which discharges the initial fill spray to the drain to carry away food wastes and afterward recirculates the cleansing liquid.

The changing of the two-way valve to the recirculating position allows the fill of cleansing liquid to accumulate in the lower portion of the dishwashing chamber. This, together with the recirculation provided by the pump, is sufficient to apply a pressure differential upon a spring loaded strainer located over the outlet of the chamber to draw the strainer into straining position so that all of the recirculated liquid is strained before it is discharged upon the dishes. The recirculated liquid is directed into a rotatable horizontal spray tube which rotates because of the tangential introduction of the recirculating cleansing fluid into the internally finned tube. The spray tube has forwardly and rearwardly and radially discharging nozzles or outlets to provide solid streams of cleansing liquid which impinge upon the dishes within the compartment with sufficient force to clean the dishes.

After recirculation has taken place for a sufficient period of time, the cleansing liquid is discharged as waste and the spring automatically lifts the movable strainer to allow the cleansing liquid to flow about the strainer and carry away the food particles caught by the strainer to the drain. A similar rinse cycle follows. An electric heater is provided in the lower portion of the dishwashing chamber and the door is provided with vents for drying the dishes. The machine is able to accommodate a large quantity of articles to be washed but only a relatively small amount of water and soap is required.

Further objects and advantages of the present invention will be apparent from the following description, reference being had to the accompanying drawings wherein a preferred form of the invention is clearly shown.

In the drawings:

Figure 8 is a combined wiring and liquid flow diagram;

Figure 9 is a timer sequence diagram;

Figure 1:
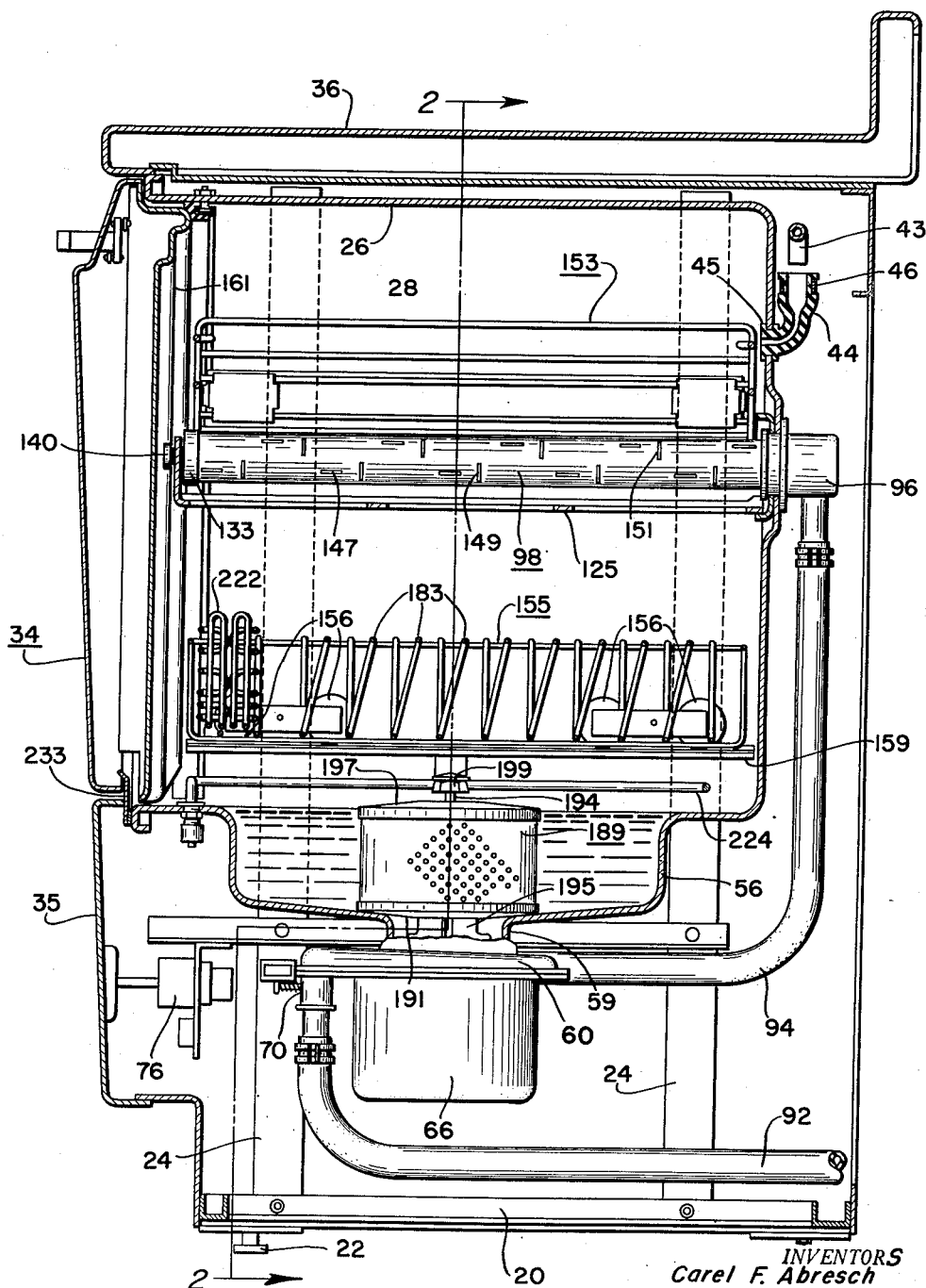
Figure 1 is a vertical sectional view through one form of dishwashing machine embodying our invention taken substantially along the line 1—1 of Figure 2.

Referring now to the drawings and more particularly to Figure 1, there is shown a lower rectangular base 20 provided with adjustable supporting feet 22 at the four corners. Four vertical support members 24 extend upwardly from the rectangular base 20 and are fastened to the sides of the substantially box-shaped dishwashing shell 26 enclosing the dishwashing chamber 28. The vertical support members 24 support a table top member 36 and ornamental side members 30 and 31. The cabinet is provided with a front door 34 which pivots downwardly upon its front edge. An ornamental cross member 35 extends across the front of the cabinet beneath the door 34 between the side panels 30 and 31.

*The door*

Figure 11:
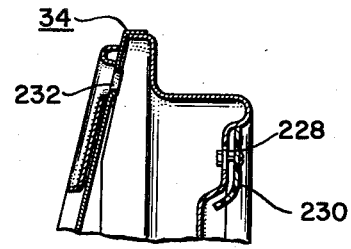
Figure 11 is a fragmentary vertical sectional view of a portion of the door showing one of the upper ventilators.

The door 34 is hollow and may be provided with a plurality of upper shielded vents 228 on its inner face which may be covered by the shields 230 of plastic material fastened to the door by screws or bolts as shown in Figure 11. The outer face of the door may be provided with ornamental openings 232 providing an outer vent for the door. The top and sides of the door may be provided with a suitable gasket type seal but the bottom of the door is left unsealed, and escape of liquid is prevented by the transverse member 233 which extends through a slot in the bottom of the door when the door is closed.

The dish racks

The dishes are supported upon two novel rectangular racks which are horizontally movably mounted in the shell 26 so that the racks may be moved outward of the cabinet for free and easy loading and unloading of the dishes. The upper rack 153 extends entirely across the interior of the chamber 28 immediately above the spray tube 98. The rack 153 has an irregular bottom portion provided with horizontal bars extending forwardly and rearwardly adapted to hold cups and tumblers with their axes directed toward the spray tube. It also includes vertical side portions and transverse members at the front and rear which support a movable sub-rack 154. This sub-rack 154 is adapted to support two rows of cups. The irregular bottom portion of the rack 153 may be used to support additional rows of cups or pans or tumblers. The rack 153 is supported for horizontal movement into and out of the cabinet by a set of drawer type guides 157. These guides include a C-shaped guide fastened to the shell 26, a pair of rollers of plastic material, such as nylon, which roll in the C-shaped guide whose axes are connected to inverted L-shaped members fastened to the sides of the rack 153. This permits the substantially complete easy frictionless withdrawal horizontally of the upper rack 153 for easy loading and unloading. The upper rack 153 receives the direct spray from the tube 98 with sufficient distribution to thoroughly clean all articles thereon. The articles, however, must be arranged on the rack so that their interiors are exposed to the direct spray and one article does not obstruct the spray from another to an extent that it will not be washed properly.

The lower rack 155 is provided with double sets of wheels 156 on either side at the front and rear which roll upon the tracks 159 provided upon the sides of the shell 26 which are in alignment with the raised portions 161 upon the door 34 when the door 34 is lowered to a horizontal position. This makes it possible to roll the lower rack 155 horizontally outwardly upon the door for easy loading and unloading. The lower rack is provided with a plurality of closely spaced upwardly extending projections 183 which can conveniently support between them many plates of various sizes as well as many other articles to be washed. The front of the rack 155 is provided with a plurality of receptacles 222 for knives, forks and spoons and is also provided with an additional perforated soap container for the detergent.

The liquid fill

Referring now more particularly to Figures 8 and 9, hot water at a temperature of 150° is supplied from a suitable hot water heater through the small pipe 38 under the control of a solenoid valve 40 connecting with a pipe 42 which terminates in a downwardly directed 180° bend 43. The downwardly directed end of the pipe 42 discharges directly into but is spaced about one inch above the top of a wide-mouthed elbow 44. As shown best in Figures 1 and 8, this elbow 44 has a horizontal outlet 45 provided with circumferential outer ribs gripping the edges of the aperture provided therefor in the upper portion of the rear wall of the shell 26. The vertical portion of the elbow 44 which is located directly beneath the mouth of the tube 42 is supported by a band clamp 46 which may be fastened to the rear wall of the shell 26. The pressure stream issuing from the mouth of the tube 42 strikes the middle curved portion within the elbow 44 providing a widely distributed heavy water spray which discharges through the interior of the chamber 28 over the dishes and articles to be washed in both the upper and lower racks. This provides a heavy solid form of spray which washes food particles from the dishes and other articles upon the racks in the chamber 28 to the outlet 59 which is centrally located within a sunken basin portion 56 in the bottom of the shell 26.

The pump and pump mounting

Figure 10:
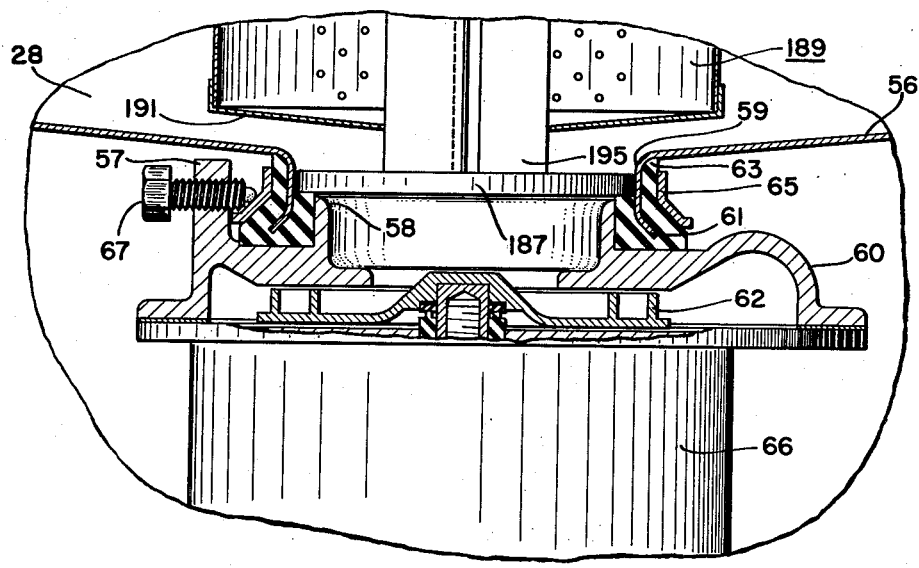
Figure 10 is a fragmentary vertical sectional view of a portion of the strainer and pump.

The outlet 59 as shown in Figure 10 is provided with outwardly turned flanges 61 which receives on both sides as well as its edge, a grooved sealing ring 63 of a rubber-like material such as natural or synthetic rubber. A flanged metal supporting ring 65 rests upon the outwardly beveled portion of the sealing ring 63. The sealing ring 63 surrounds the flanged inlet portion 58 of the centrifugal pump 60. The housing of this pump 60 has three upwardly extending ears 57 which receive set screws 67 threading into engagement with the bevel flanged portion of the ring 65 which in turn rests upon the beveled portion of the sealing ring 63 which in turn rests upon the outwardly flanged portion 61 of the outlet 59. Thus, in this arrangement the grooved sealing ring 63 not only seals the pump 60 to the outlet 59 of the shell 26 but it also provides a resilient support as well as a noise deadening sound absorbing mounting for the pump 60 and the motor and motor housing 66 which connect to and rotate the centrifugal impeller 62 within the housing of the pump 60.

The timing and control system

The outlet of the pump 60 connects directly to a solenoid operated two-way valve 70 having an operating solenoid 72 with one terminal connected by the conductor 74 to the clock-type timer 76 and a second conductor 75 connecting to a conductor 78 which connects one terminal of the solenoid for the inlet valve 40 through a branch conductor 79 to the one supply conductor 82. When deenergized, the valve 70 assumes a position allowing the pump 60 to discharge to the drain conduit 92. The pump motor 66 is connected by the conductor 80 with the timer 76 and by the conductor 81 to the conductor 78. All the electric energy supplied to the dishwasher is supplied through the conductors 82 and 84. Both of these conductors connect with the timer but the conductor 82 also connects with the branch conductor 79 which connects with the combined push button and pilot light 234. The second terminal of the pilot light 234 connects with the timer 76. The pilot light 234 is used to illuminate a translucent push button 235 operating a switch 237 having one terminal connected to a starting relay 239 which when energized closes a switch 241 both of which connect with separate terminals upon the timer 76. The second terminal of the switch 237 also connects with a separate terminal upon the timer 76. The purpose of the push button switch 237 and the relay 239 is to use the push button of switch 237 to energize the relay 239 which will then close the switch 241 to start operation of the clock motor which operates the timer 76. The push button of switch 237 may then be released to open the switch 237 and the switch 241 is then kept closed by the current which flows through it and through the coil 239 in series.

The timer 76 also has terminals in series with the supply conductor 84 which connect to a spring opened interlock switch 90 which is normally held closed by the door 34 when in closed position. The opening of the door 34 releases the switch 90 for opening under the influence of its spring to stop the operation of the motor 66 and the timer 76 and simultaneously deenergizing the solenoid inlet valve 40 so that all liquid discharge within the dishwashing chamber will be stopped immediately when the door 34 is opened. The timer also has a terminal connected by a conductor 226 to an electric heater 224 of the sheathed tubular type which extends around the lower portion of the shell 26 beneath the lower dish rack 155.

The timer 76 controls the operation of the dishwasher in accordance with the time sequence chart shown in Figure 9. It has a manually rotatable dial knob 276 rotated by the timer motor in accordance with the progression of the cycle as in Figure 9. As shown by this chart, the timer provides initial connections to the main motor, the fill solenoid and one connection to the pilot light, heater and timer motor. The closing of the switch 237 by operation of the push button 235 will energize the pilot light 234 and the timer motor of the timer 76 and also the main motor 66. This will cause a flow of hot water through the pipe 38 and the solenoid valve 40 and the pipe 42 which discharges into the elbow 44 forming a heavy spray initial fill which discharges into the dishwashing chamber 28. The solenoid 72 of the two-way valve 70 is not energized as shown by the chart in Figure 9 so that the initial fill heavy spray which removes food particles from the dishes passes through the outlet 59 and is pumped by the pump 62 into the solenoid valve 70 which remains open for discharge to the drain conduit 92. The operation of the timer motor then energizes the solenoid 72 to operate the valve 70 to close the discharge passage and connect the valve 70 to recirculate the water in the system. The two-way valve 70 has a second outlet connected by the tube 94 with the tangential inlet fitting 96.

The rotatable spray tube

Figure 4:
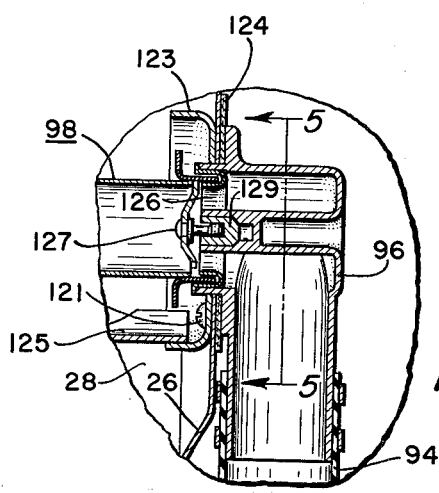
Figure 4 is a fragmentary vertical sectional view showing the rear bearing and inlet connections of the rotatable horizontal spray tube.
Figure 5:
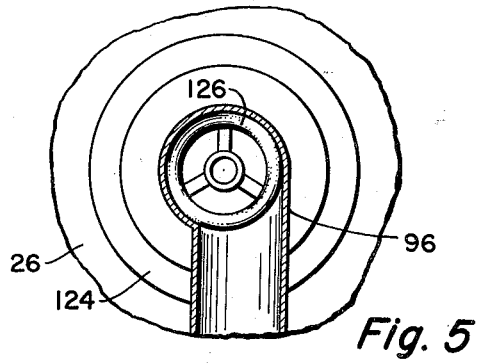
Figure 5 is a transverse vertical sectional view taken substantially along the lines 5—5 of Figure 4.

As shown in Figures 4 and 5, this fitting includes a flat cylindrical shaped housing having a tangential inlet fitting connecting with the tube 94 which enters the cylindrical portion of the fitting 96 substantially along a tangent to the periphery of the fitting. The fitting 96 has a flanged portion which extends forwardly through an aperture in the upper rear wall portion of the dishwashing chamber shell 26. The fitting 96 is fastened to the rear wall of the shell 26 by screws 121 which extend rearwardly through the rear portion 123 of a cantilever bracket 125 as well as through apertures in the adjacent wall portion of the shell 26 and a through gasket 124 into the flange portion of the fitting 96.

The central portion of the fitting 96 is provided with a bearing 129 which may be of any suitable bearing metal. This bearing 129 is adapted to receive a small bearing shaft 127 supported by a spider within the adjacent end of the spray tube 98. The inwardly projecting portion of the fitting 96 is provided with a flanged ring 126 which extends around the adjacent end of the spray tube 98 so as to provide a shield to prevent the escape of the liquid between the fitting 96 and the spray tube 98. The opposite end of the spray tube 98 is closed by a cap member 133 having a central bearing portion which receives a bearing member provided upon the inner end of a screw 140 which threads into the front end portion of the cantilever mounted bearing support 125. This cantilever bearing support 125 is located beneath the tube 98 and is provided with open portions so that it does not appreciably block the spray from the tube 98. The tube 98 is provided with a plurality of radially directed nozzles or jet apertures 147 arranged in a plurality of rows around the spray tube 98 as well as forwardly directed nozzles or jet apertures 149 and rearwardly directed nozzles or jet apertures 151. The tangential flow of liquid under pressure into the inlet fitting 96 and from thence into the spray tube 98 causes the spray tube 98 to rotate upon its front and rear bearings. The liquid is discharged radially in solid forceful cleansing streams through the apertures 147 and forwardly and rearwardly at an angle through the apertures 149 and 151 as the spray tube 98 rotates. The rotation of the spray tube 98 is due to the reaction of the rotation of the liquid within the fitting 96 and the tube 98 impinging against the various apertures 147, 149 and 151. The streams cover substantially all portions of articles held in the upper and lower racks.

The strainer

Seated upon the rubber ring 63 immediately above the flanged opening of the pump 60 is a support 187 for the spring mounted strainer 189. This support 187 is provided with ample openings and has a guide portion 195 upon which the bottom 191 of the strainer 189 is slidably mounted. The bottom 191 has an opening surrounding the guide portion 195. The top 197 of the strainer is slidably mounted upon a vertical rod 194 having its lower end supported by the member 195. A cap nut 199 is provided upon the top of the rod 194 to limit the upward movement of the strainer 189. Within the strainer 189 is provided a light or weak compression type coil spring 193 which resiliently urges the strainer 189 upwardly against the cap nut 199 to the position shown in Figure 10 so that there is a space between the bottom 191 of the strainer 189 and the bottom of the sump 56 as shown in Figure 10. The strainer 189 is provided with perforated cylindrical side walls which are capable of straining the cleansing fluid and preventing the recirculation of large food particles.

Figure 2:
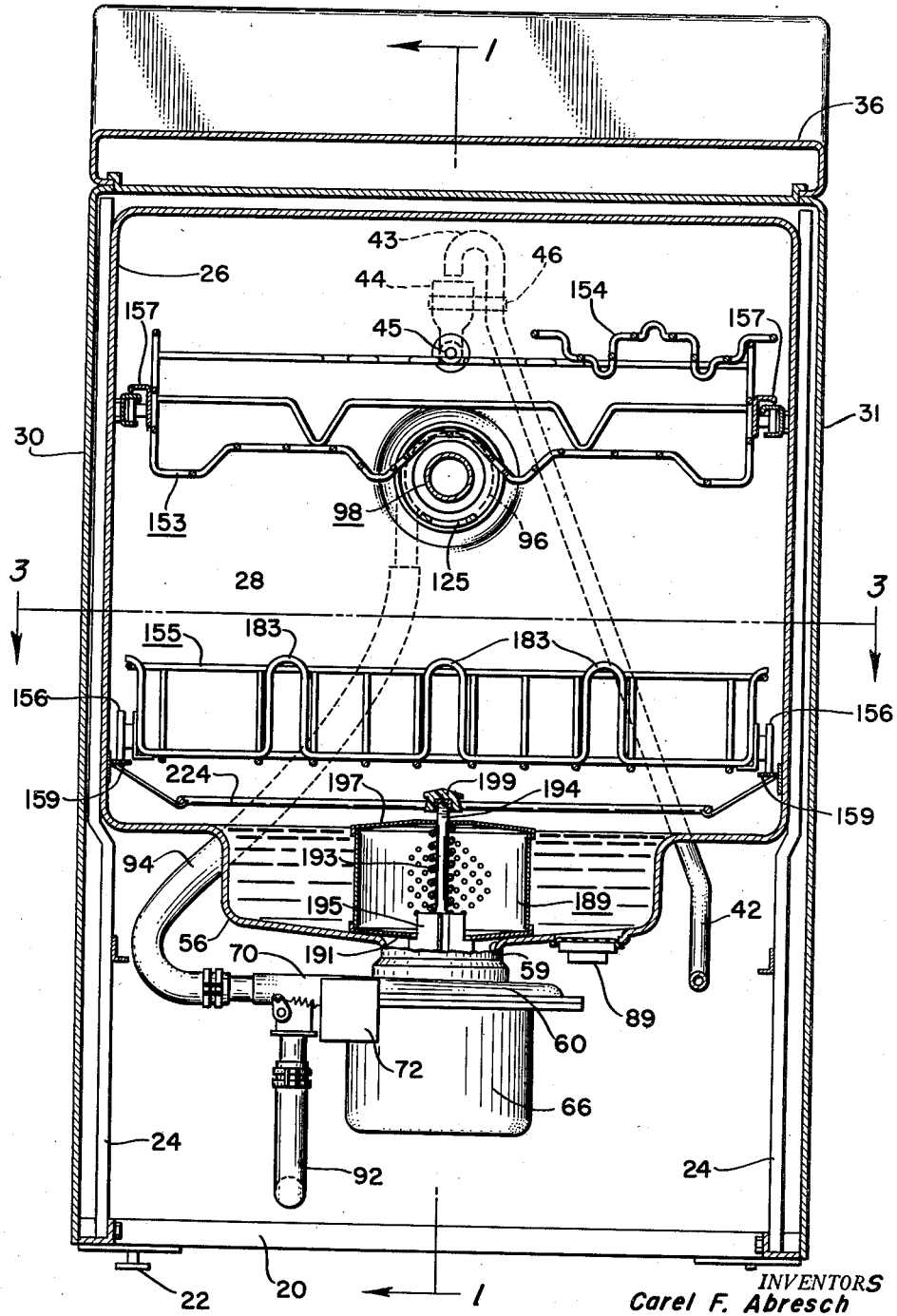
Figure 2 is a vertical sectional view taken along the line 2—2 of Figure 1.
Figure 3:
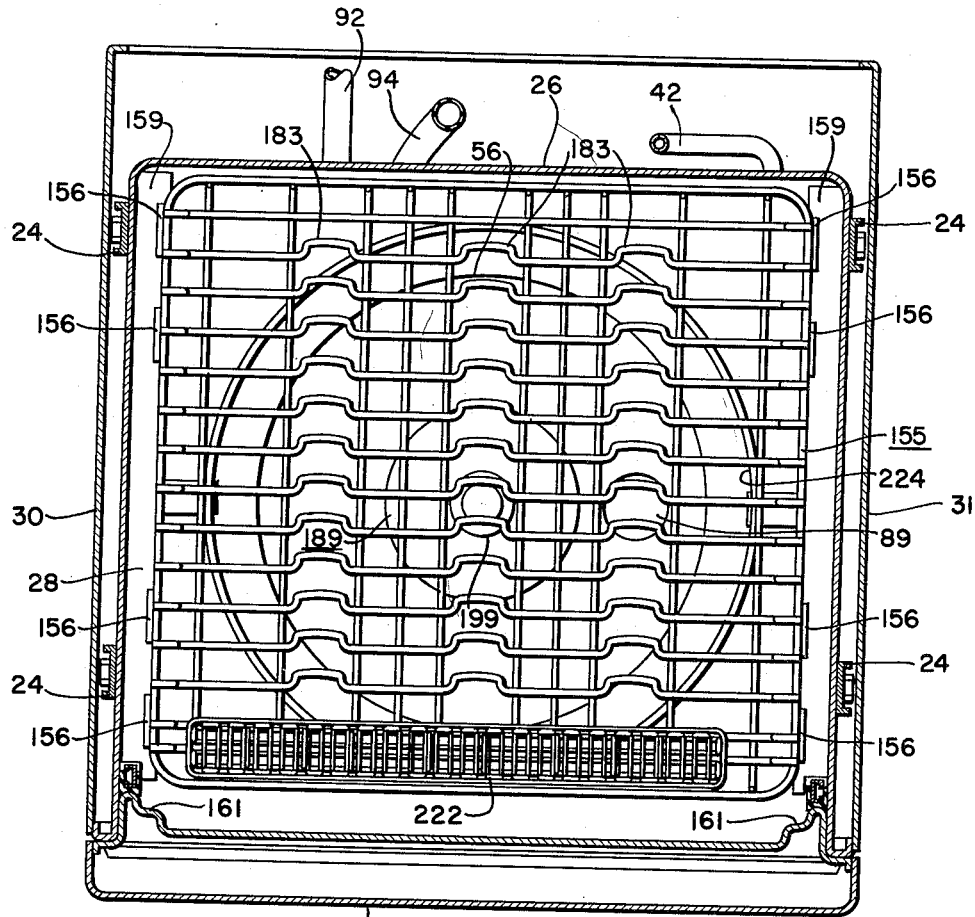
Figure 3 is a horizontal sectional view taken substantially along the line 3—3 of Figure 2.

The bottom of the sump 56 is provided with a pressure operated liquid level responsive switch 89 which is connected in series with the solenoid fill valve 40 by the conductors 91 and 93 so as to shut the fill valve 40 when the liquid level reaches substantially the level shown in Figures 1 and 2. This brings the liquid level substantially to the top of the strainer 189. The recirculation of the liquid by the pump 60 through the tube 94, the fitting 96 and the spray tube 98 when this liquid level is reached causes a pressure differential upon the strainer 189 when in the position shown in Figure 10 which is sufficient to provide a downward pull greater than the upward force of the spring 193. The reason for this is the restricted area for flow between the bottom 191 of the strainer 189 and the adjacent bottom portion of the sump 56. The bottom 191 of the strainer 189 also has an opening which receives the guide portion 195 which allows the liquid entering the strainer 189 through the perforated cylindrical walls to flow through this central opening in the bottom 191 through the support 195 into the flanged opening 59 forming the inlet to the pump 60. As a result of this pressure differential, the strainer 189 is pulled down to the position shown in Figures 1 and 2 and thus forces all of the liquid flowing from the sump 56 to the pump inlet to pass through the perforations in the cylindrical wall of the strainer 189.

The timer sequence shown in Figure 9 indicates two lower lines for the pilot light, heater and timer motor. The upper or fourth line indicates the closing of contacts connected in series with the solenoid 239 controlled by one cam for controlling the starting and stopping of the entire cycle. The closing of the switch 237 by the push button 235 energizes the holding solenoid 239 to close the switch 241 to operate the timer until additional contacts are closed by the second timer cam. After these additional contacts are closed, the one cam opens the contacts connected in series with the solenoid 239 to release and open the switch 241. The second cam, as indicated by the bottom line, properly closes these additional contacts in parallel circuit to the relay 239 for continued operation of the timer until the end of the entire cycle and also continues the energization of the pilot light and the heater 224 for the same period. The main motor 66 also operates except for a brief interval at the beginning of the operation of the timer. The fill solenoid valve 40 is first opened to flush the dishes while the motor 66 and the pump 60 are operated with the drain valve 70 opened. The drain valve 70 is then energized to close the drain while the motor 66 and the pump 60 are stopped but the filling continues until the sump 56 is filled to the top of the strainer 189. The opening of the liquid level switch 89 stops the filling. This motor 66 operates the pump 60 and the impeller 62 at sufficient speed to provide a strong pressure to rotate the spray tube 98 and to cause forceful streams of water to issue from the jets 147, 149 and 151 of the tube 98, These streams of water are sufficient to thoroughly wash the dishes in the shell 26. The volume of liquid being recirculated and flowing beneath and through the strainer 189 causes sufficient pressure differential and suction to pull the strainer 189 from its lower position as shown in Figure 10 to its lower position shown in Figures 1 and 2.

The recirculation of the washing liquid continues for about 10 minutes after which the solenoid 72 is deenergized and the two-way valve 70 is moved to discharge the discharge from the pump 60 into the drain connection 92. This soon lowers the volume of liquid in the circuit and the sump 56 so as to reduce the pressure differential upon the strainer 189 so much that the spring 193 can then raise the strainer 189. This allows the cleansing liquid being circulated through the system to wash the sides of the strainer 189 so that any food particles clinging thereto will pass between its bottom and the bottom of the sump and through the pump 60 directly to the drain 92 so that the strainer is cleaned at the end of each recirculating cycle. Following this, as shown by Figure 9, the fill solenoid 40 is again energized to supply hot rinse water through the pipe 42 and the elbow 44 into the chamber 28 after which the solenoid 72 is again energized to close the drain discharge 92 and to recirculate the rinse water as is shown in Figure 9. At the end of this period, the rinse water is then discharged to the drain at the same time cleaning the strainer at the end of the wash period. A second similar rinse period follows. The dishes and other articles are then dried by the continued energization of the heater 224. This heating period continues for about twenty-four minutes. At the end of this time, the second cam opens the additional contacts as indicated by the last line of Figure 9. This deenergizes the timer motor since the previous deenergization of the solenoid 239 has kept open the switch 241. The dishes may then be removed.

Figure 6:
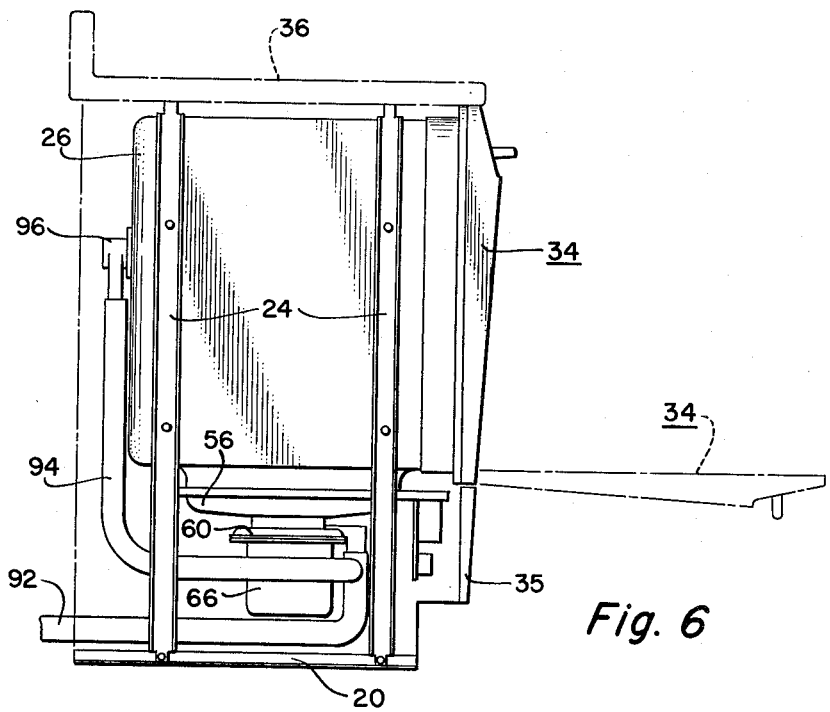
Figure 6 is a left side view of the machine with the outer walls and top removed.
Figure 7:
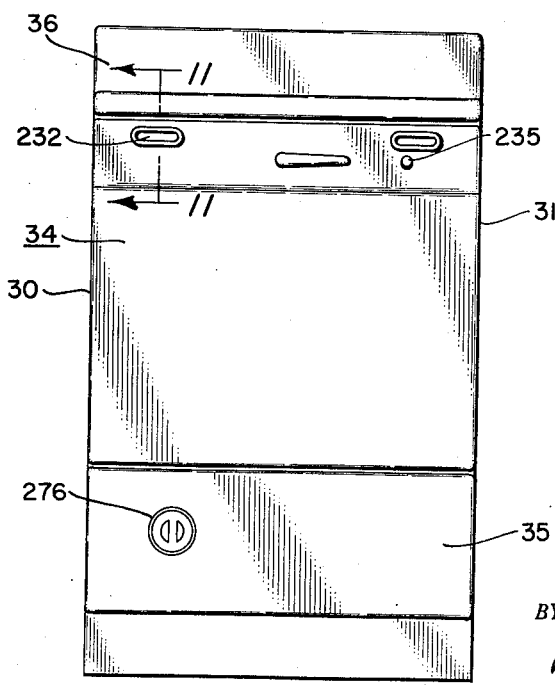
Figure 7 is a front view of the machine.

The construction and arrangement allows a wide variety of dishes and kitchenware to be washed on the upper and lower racks. The dishwaser may be installed under various types of table tops and may be manufactured as a unit of the type shown in Figure 6 and provided with a suitable cabinet as shown in Figure 7 or incorporated in kitchen ensembles of various types having special continuous cabinet construction. The operating cycle efficiently washes and dries the dishes and kitchenware thoroughly and economically.

While the form of embodiment of the invention as herein disclosed constitutes a preferred form, it is to be understood that other forms might be adopted, as may come within the scope of the claims which follow.

What is claimed is as follows:

1. A dishwashing machine including walls enclosing a dishwashing chamber, the bottom wall being provided with an outlet, means for conducting cleansing fluid at a limited rate to said chamber, controllable means for removing cleansing fluid through said outlet and either returning it to said chamber or disposing of the fluid as waste, a movable strainer having a lower position completely covering said outlet and an upper position allowing a free flow beneath the edges into the outlet, and a light spring means exerting an upward force upon the strainer for normally urging the strainer into the upper position.

2. A dishwashing machine including walls enclosing a dishwashing chamber, the bottom wall being provided with an outlet, means for conducting cleansing fluid at a limited rate to said chamber, controllable means for removing cleansing fluid through said outlet and either returning it to said chamber or disposing of the fluid as waste, a movable strainer having a lower perimeter enclosing a large area extending into contact with the bottom wall surrounding said outlet completely enclosing said outlet when in its lower position for straining the cleansing fluid during the recirculation thereof, and a spring means exerting an upward force upon the strainer for lifting the strainer to permit the flow of cleansing fluid beneath its perimeter into the outlet when the restriction thereon of the water flowing to the outlet is light, said spring means being sufficiently low in spring force and the strainer being constructed with sufficient restriction that during recirculation of the cleansing fluid the force of the spring means is overcome and the strainer is kept in its lower position.

3. A dishwashing machine including walls enclosing a dishwashing chamber, the bottom wall being provided with an outlet, a pump having its inlet connected to said outlet and being provided with a pump outlet, a two-way valve having its inlet connected to said pump outlet, a spray device having discharge means communicating with the interior of said dishwashing chamber, said valve having one outlet and conduit means connecting to said spray device, said valve having a second outlet and conduit means for discharge to waste, and a spring mounted strainer arrangement for said outlet in said bottom wall including a strainer of a size sufficient to completely cover said outlet and a light spring having a force sufficient to lift the strainer away from the opening when no liquid accumulates in the chamber while the pump is in operation but insufficient to balance the pressure differential when the pump is operating and liquid has substantially covered the strainer.

4. A dishwashing machine including walls enclosing a dishwashing chamber, the bottom wall being provided with an outlet, a pump having its inlet connected to said outlet and being provided with a pump outlet, a two-way valve having its inlet connected to said pump outlet, a spray device having discharge means communicating with the interior of said dishwashing chamber, said valve having one outlet and conduit means connecting to said spray device, said valve having a second outlet and conduit means for discharge to waste, and a spring mounted strainer arrangement for said outlet in said bottom wall including a strainer of a size sufficient to completely cover said outlet and a light spring having a force sufficient to lift the strainer away from the opening when no liquid accumulates in the chamber while the pump is in operation but insufficient to balance the pressure differential when the pump is operating and liquid has substantially covered the strainer, and a liquid level control set to continue the opening of the supply valve means until the level in the chamber is sufficient to raise the pressure differential upon the strainer high enough to pull down the strainer when the pump operates.

5. A dishwashing machine including walls enclosing a dishwashing chamber, the bottom wall being provided with an outlet, means for conducting cleansing fluid at a limited rate to said chamber, controllable means for removing cleansing fluid through said outlet and either returning it to said chamber or disposing of the fluid as waste, a strainer support removably mounted within said outlet, a strainer extending over and covering said outlet provided with a vertically movable mounting upon said strainer support, and a light spring means mounted upon said strainer support and exerting an upward force upon said strainer to lift said strainer.

6. A dishwashing machine including walls enclosing a dishwashing chamber, the bottom wall being provided with an outlet, means for conducting cleansing fluid to said chamber, controllable means for removing cleansing fluid through said outlet and either returning it to said chamber or removing it as waste, a strainer extending as a cap over said outlet, means mounting said strainer for upward and downward movement over said outlet to an upper position allowing flow beneath from the chamber to the outlet and to a lower position substantially completely covering said outlet, a light spring means for lightly urging said strainer to its upper position, and means for stopping the flow of cleansing fluid into said chamber when the liquid level is above the bottom of said strainer.

(References on following page)

References Cited in the file of this patent

UNITED STATES PATENTS

| | | |
|---|---|---|
| 1,583,657 | Chapman | May 4, 1926 |
| 1,701,066 | Elkington | Feb. 5, 1929 |
| 1,999,946 | Rogers | Apr. 30, 1935 |
| 2,022,637 | Huppmann | Nov. 26, 1935 |
| 2,250,974 | Stoddard | July 29, 1941 |
| 2,395,747 | Loeb | Feb. 26, 1946 |
| 2,595,659 | Hollerith | May 6, 1952 |
| 2,595,660 | Hollerith | May 6, 1952 |
| 2,621,505 | Smith | Dec. 16, 1952 |
| 2,629,390 | Walker | Feb. 24, 1953 |
| 2,649,765 | Anderson | Aug. 25, 1953 |